(12) United States Patent
Upreti et al.

(10) Patent No.: US 8,574,657 B2
(45) Date of Patent: Nov. 5, 2013

(54) HEAT-TREATED FLOUR

(75) Inventors: Praveen Upreti, Orchard Park, NY (US); John S. Roberts, Honeoye Falls, NY (US); Rohit Jalali, Ridgeway (CA)

(73) Assignee: Rich Products Corporation, Buffalo, NY (US)

( * ) Notice: Subject to any disclaimer, the term of this patent is extended or adjusted under 35 U.S.C. 154(b) by 262 days.

(21) Appl. No.: 12/576,730

(22) Filed: Oct. 9, 2009

(65) Prior Publication Data

US 2010/0092639 A1  Apr. 15, 2010

Related U.S. Application Data

(60) Provisional application No. 61/104,476, filed on Oct. 10, 2008.

(51) Int. Cl.
*A21D 2/00* (2006.01)

(52) U.S. Cl.
USPC ............ 426/622; 426/661; 426/443; 426/465

(58) Field of Classification Search
USPC ........................................................ 426/622
See application file for complete search history.

(56) References Cited

U.S. PATENT DOCUMENTS

| | | | |
|---|---|---|---|
| 1,636,569 A | 7/1927 | Kent-Jones et al. | |
| 1,710,503 A | 4/1929 | Kent-Jones et al. | |
| RE19,712 E | 9/1935 | Haas | |
| 2,680,303 A * | 6/1954 | Gustavson | 34/393 |
| 3,159,493 A | 12/1964 | Japikse et al. | |
| 3,428,461 A | 2/1969 | Hatton et al. | |
| 3,490,917 A | 1/1970 | Doe et al. | |
| 3,585,049 A | 6/1971 | Galle | |
| 3,783,164 A | 1/1974 | Galle | |
| 3,869,558 A | 3/1975 | Hampton et al. | |
| 3,977,897 A | 8/1976 | Wurzburg et al. | |
| 4,013,799 A | 3/1977 | Smalligan et al. | |
| 4,157,406 A | 6/1979 | Hanamoto et al. | |
| 4,259,362 A | 3/1981 | Hanamoto et al. | |
| 4,418,090 A | 11/1983 | Bohrmann et al. | |
| 4,937,087 A | 6/1990 | Bush et al. | |
| 5,334,402 A | 8/1994 | Ovadia | |
| 5,352,473 A | 10/1994 | Chiqurupati et al. | |
| 5,389,388 A * | 2/1995 | Gusek | 426/242 |
| 5,433,966 A * | 7/1995 | Wolt et al. | 426/549 |

(Continued)

FOREIGN PATENT DOCUMENTS

| | | |
|---|---|---|
| EP | 0105640 | 4/1984 |
| EP | 1553838 | 8/2006 |

(Continued)

OTHER PUBLICATIONS

Cauvain: Baking problems solved; CRC Press, 2001—Cooking—280 pages.*

(Continued)

*Primary Examiner* — Patricia George
(74) *Attorney, Agent, or Firm* — Fay Sharpe LLP

(57) ABSTRACT

A method for heat-treating flour comprising the steps of dehydrating the flour to minimize or avoid gelatinization, and heat treating the dehydrated flour. The resulting flour has increased moisture absorption. Dough made from the heat-treated flour has improved performance and baked goods made from the heat-treated flour have improved properties relative to dough and baked goods made from untreated flour.

24 Claims, 11 Drawing Sheets

(56) References Cited

U.S. PATENT DOCUMENTS

| | | | |
|---|---|---|---|
| 5,439,696 A | | 8/1995 | Rabe et al. |
| 5,456,930 A | | 10/1995 | Gusek et al. |
| 5,720,822 A | | 2/1998 | Jeffcoat et al. |
| 5,725,676 A | | 3/1998 | Chiu et al. |
| 5,906,851 A | | 5/1999 | Smith |
| 5,932,017 A | * | 8/1999 | Chiu et al. ............. 127/67 |
| 6,010,574 A | | 1/2000 | Jeffcoat et al. |
| 6,221,420 B1 | | 4/2001 | Thomas et al. |
| 6,231,675 B1 | | 5/2001 | Chiu et al. |
| 6,261,376 B1 | | 7/2001 | Jeffcoat et al. |
| 6,451,121 B2 | | 9/2002 | Chiu et al. |
| 6,616,957 B1 | | 9/2003 | Wilhelm et al. |
| 6,887,509 B2 | | 5/2005 | Leusner et al. |
| 2006/0263503 A1 | * | 11/2006 | Okoniewska et al. ........ 426/549 |
| 2007/0292583 A1 | * | 12/2007 | Haynes et al. ................ 426/549 |

FOREIGN PATENT DOCUMENTS

| | | |
|---|---|---|
| GB | 228829 | 12/1924 |
| GB | 263897 | 12/1926 |
| GB | 1499986 | 2/1978 |
| JP | 63116657 | 5/1988 |
| JP | 06030713 | 2/1994 |
| JP | 06086659 A  * | 3/1994 |
| JP | 10052232 | 2/1998 |
| JP | 10057000 | 3/1998 |
| JP | 11075749 | 3/1999 |
| JP | 2000125794 | 5/2000 |
| JP | 2008067674 | 3/2008 |
| JP | 2008067675 | 3/2008 |

OTHER PUBLICATIONS

McDermott: The 'Turbidity' Test as a Measurement of Thermal Denaturation of Proteins in Wheat; J. Sci. Fd Agric., 1971, vol. 22, February.*

Greer: The Water Absorption of Wheat Flour: Relative Effects of Protein and Starch; J. Sci. Food Agric 10, Apr. 1959.*

Abdullah: Fungal spoilage of starch-based foods in relation to its water activity (aw); Journal of Stored Products Research 36 (2000) 47±54.*

* cited by examiner

| Measured parameters | No heat treatment | Time/Temperature Treatments of Flour | | | | | | | | | | | | | |
|---|---|---|---|---|---|---|---|---|---|---|---|---|---|---|---|
| | | 260 F | | | | 290 F | | | | | 320 F | | | 350 F | |
| Treatment Time (minutes) | | 4 | 8 | 20 | 56 | 3 | 5 | 8 | 12 | 20 | 2 | 4 | 6 | 3 | 5 |
| Absorption (500 BU) | 68.6 | 77.3 | 77.4 | 83.0 | 85.5 | 77.0 | 81.2 | 81.8 | 83.5 | 85.5 | 75.6 | 82.6 | 85.4 | 83.5 | 85.2 |
| Absorption (14% moisture) | 63.2 | 65.2 | 65.9 | 69.5 | 72.9 | 64.6 | 68.9 | 69.2 | 70.1 | 72.1 | 63.7 | 69.7 | 72.4 | 70.8 | 73.2 |
| Stability (minutes) | 13.0 | 7.2 | 9.1 | 12.0 | 10.7 | 7.5 | 8.8 | 13.3 | 13.4 | 13.8 | 8.6 | 14.4 | 14.3 | 13.7 | 19.7 |
| Development time (minutes) | 8.5 | 7.0 | 8.3 | 10.5 | 12.2 | 6.7 | 7.4 | 10.7 | 15.2 | 16.0 | 8.7 | 12.2 | 16.5 | 12.0 | 20.0 |
| Tolerance index (BU) | 42.0 | 61.0 | 54.0 | 38.0 | 35.0 | 55.0 | 53.0 | 34.0 | 0.0 | 29.0 | 59.0 | 21.0 | 23.0 | 24.0 | 0.0 |
| Time to breakdown (minutes) | 12.5 | 9.9 | 10.9 | 14.4 | 16.5 | 10.0 | 10.3 | 15.3 | 20.0 | 21.4 | 10.8 | 18.9 | 22.0 | 17.8 | 20.0 |
| Farinograph quality number | 125.0 | 99.0 | 109.0 | 144.0 | 165.0 | 100.0 | 103.0 | 153.0 | 200.0 | 214.0 | 108.0 | 189.0 | 220.0 | 178.0 | 200.0 |

Figure 4

| Properties | 10.9% | 10.9% 290F, 4 min. | 11.3% | 11.3% 290F, 4 min. | 11.7% | 11.7% 290F, 4 min. | 12.0% | 12.0% 290F, 4 min. | 12.4% | 12.4% 290F, 5 min. | 13.1% | 13.1% 290F, 5 min. |
|---|---|---|---|---|---|---|---|---|---|---|---|---|
| Moisture (%) | 12.6 | 3.0 | 8.7 | 1.3 | 11.4 | 2.3 | 11.6 | 1.4 | 12.3 | 1.6 | 12.8 | 1.3 |
| Absorption (500BU) | 60.4 | 74.2 | 64.5 | 76.8 | 60.6 | 75.8 | 61.9 | 77.0 | 65.5 | 78.3 | 67.0 | 82.6 |
| Absorption (14%) | 58.8 | 62.8 | 58.7 | 63.9 | 57.6 | 63.8 | 59.2 | 64.2 | 63.5 | 65.7 | 65.6 | 69.7 |
| Development Time (min.) | 16.1 | 17.0 | 19.1 | 17.1 | 15.0 | 15.4 | 16.7 | 14.9 | 9.7 | 20.2 | 18.7 | 20.6 |
| Stability (min.) | 9.5 | 11.7 | 12.5 | 12.2 | 8.9 | 12.5 | 9.7 | 11.7 | 13.7 | 14.3 | 13.7 | 17.8 |
| Tolerance Index | 19 | 11 | 17 | 10 | 25 | 19 | 24 | 20 | 27 | 15 | 12 | 6 |
| Time to Breakdown | 17.0 | 21.6 | 22.0 | 22.1 | 15.0 | 20.0 | 16.5 | 19.0 | 15.8 | 26.0 | 23.0 | 30.0 |
| Farinograph No. | 170 | 216 | 220 | 221 | 150 | 200 | 165 | 190 | 158 | 260 | 230 | 300 |

Figure 5

HEAT-TREATED FLOUR

CROSS-REFERENCE TO RELATED APPLICATION

This application claims priority to U.S. Provisional application No. 61/104,476, filed on Oct. 10, 2008, the disclosure of which is incorporated herein by reference.

FIELD OF THE INVENTION

The present invention relates generally to the field of improving water absorption capacity, dough handling and baking quality of flour and more particularly provides methods for heat treatment of flour to improve its performance.

DISCUSSION OF RELATED ART

Heat treatment of flour or wheat has been carried out in the art for various purposes. For example, Japiske et al. (U.S. Pat. No. 3,159,493) subjected flour to temperatures of 260-310° F. in an atmosphere containing water vapor under elevated pressure for 1-10 minutes to eliminate microorganism contaminants in flour with a minimum irreversible change in the physiochemical properties of flour. At temperatures below this range microorganism contaminants were not completely eliminated, and temperatures above this range were likely to damage the flour.

Hatton et al. (U.S. Pat. No. 3,428,461) treated flour at temperatures of 150-360° F. in an atmosphere with greater than 40% relative humidity for 10-80 minutes, to make the treated flour useful in culinary mixes. Bush et al. (U.S. Pat. No. 4,937,087) heat treats farina at 300-600° F. for 30-180 seconds to reduce the moisture content of the farina, such that 10% of the starch is gelatinized.

However, none of the above references provide a method by which the properties of dough made from heat-treated flour or wheat are improved with respect to moisture absorption, adhesiveness, farinograph quality number and tolerance index.

SUMMARY OF THE INVENTION

The present invention provides heat-treated flour having improved properties and a method for preparing the same. In one aspect, the present invention provides a method for heat-treating flour comprising the steps of: a) providing a flour; b) thermally dehydrating the flour such that the moisture content of the flour is reduced to 1.5 to 4.1% and the flour is not gelatinized; and c) heating the dehydrated flour such that the moisture content of the flour does not go below 1.5% to obtain a heat-treated flour. In the heat-treated flour at least 7% of the total proteins in the heat-treated flour are denatured. The heat-treated flour exhibits an increase in moisture absorption of at least 3.0% relative to untreated flour.

In one embodiment, steps b) and c) of the method for heat-treating flour are carried out as two discrete operations. In another embodiment, steps b) and c) of the method are carried out in a single unit operation.

In another aspect, the present invention provides heat-treated flour with a moisture content of 1.5% to 4.1%. The amount of denatured protein in the heat-treated flour is greater than 7%, and the flour has discernable starch granules. In one embodiment, the heat-treated flour has particle size distribution such that greater than 80% of the flour particles are between 90 and 150 microns or greater than 80% of the flour particles are between 90 and 150 microns and greater than 7% of the flour particles are between 150 and 250 microns.

The present invention also provides doughs made from heat-treated flour which exhibit improved performance, and baked-goods made from heat-treated flour which exhibit improved properties. In one embodiment, a dough made from flour heat-treated according to the present method exhibits at least 3% reduced stickiness and/or at least 3% reduced adhesiveness and/or at least 3% increased strength compared to dough made from untreated flour.

BRIEF DESCRIPTION OF THE FIGURES

FIG. 4. Farinograph data for flour which was dehydrated and heated in a combined process.

FIG. 5. Farinograph data for untreated and treated flours (combined process) with 10.9-13.1% protein content.

DETAILED DESCRIPTION OF THE INVENTION

Figure 1:
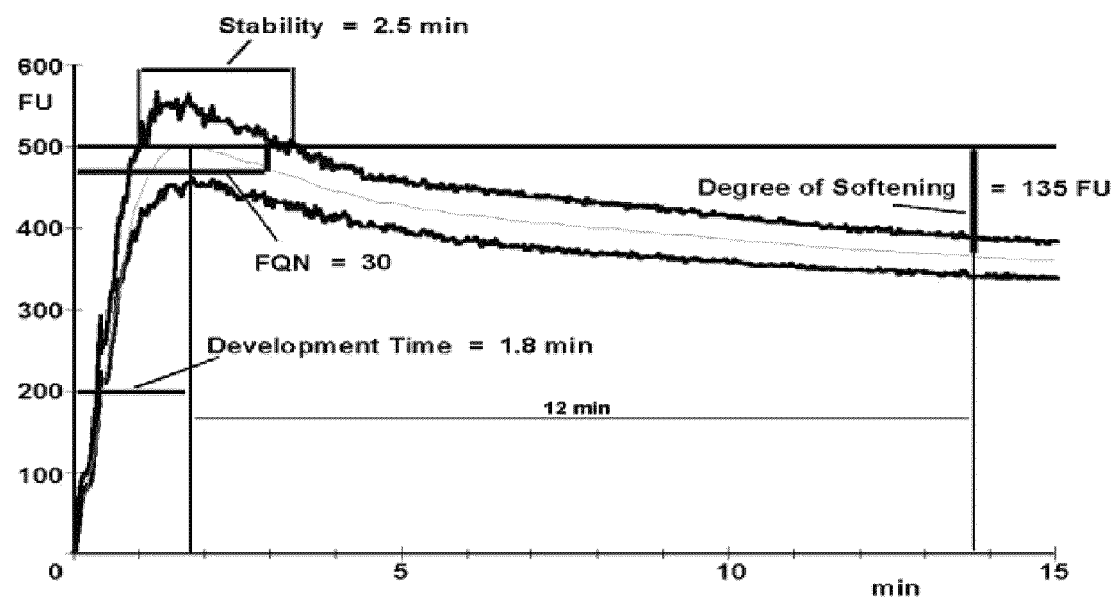
FIG. 1. An example of a farinograph of dough.

The present invention provides heat-treated flour having improved properties and a method for preparing the same. Thus, this invention provides a method for increasing the water absorptive capacity of flour without compromising the baking performance of dough made from the flour. The method comprises the steps of dehydrating the flour and heating the dehydrated flour.

While known heat treatment regimens can result in increased absorptive properties of the flour, the baking performance of the flour does not appear to be correlated with the increased water absorptive capacity. The present invention is based on the surprising observation that to increase water absorptive capacity, as well as baking performance, it was necessary to heat treat the flour under conditions which do not support gelatinization. Accordingly, the method of the present invention comprises the steps of heating flour while minimizing gelatinization.

We found that whether or not gelatinization of flour occurred depended not only on the temperature at which the flour was dehydrated or its final moisture content, but also on the rate of dehydration which in turn is related to mode of heating. Gelatinization temperature is inversely proportional to the moisture content—as the moisture content decreases the gelatinization temperature increases. Thus, in the present invention, during dehydration, gelatinization is minimized or avoided by heating the flour under conditions such that moisture is rapidly removed while being heated, thereby increasing the gelatinization temperature. If the flour is not dehydrated at a rapid rate, it may reach gelatinization temperature which can lead to gelatinization of the flour. For example, it is desirable to reduce the moisture content of the flour to a value from 4.1% to 1.5% within a minute, and preferably within 45 or 30 seconds, to avoid gelatinization.

It is considered that avoiding gelatinization preserves the properties of the starch in the flour which contribute to improved baking performance of the doughs prepared from the heat-treated flour. Thus, improved baking performance is an indication of minimal gelatinization during the heat treatment. Additionally, intact starch granules (as identified by birefringence data) are also indicative of a lack of gelatinization.

The first step in the process of the present invention is dehydration. Dehydration of the flour lowers the specific heat of the flour (resulting in more efficient heat transfer). After dehydration the starch granules are intact and discernable (as demonstrated by birefringence data) which is indicative of a lack of gelatinization. During dehydration according to the present invention, the moisture content of the flour is reduced to a value of from 1.5% to 4.1% by weight of the flour, including all integers and tenths of a percent between 1.5% and 4.1%. Preferably, the moisture content is reduced to from 2.0% to 3.5%, including all integers and tenths of a percent between 2.0% to 3.5%. It is important to keep the moisture at 4.1% or less because above 4.1% subsequent heating to higher temperature could lead to gelatinization and other changes (e.g., undesirable starch damage) affecting moisture absorption, dough formation and baking quality. It is also important to keep the moisture content of the flour above 1%, and preferably above 1.5%, as it was observed that reducing the moisture to 1% or lower results in poor dough formation and baked products with unacceptable quality and low BSV. Without intending to be bound by any particular theory, it is considered that if the flour is dehydrated to 1% moisture or less, the starch granules and proteins are modified such that they adversely affect dough formation.

Typically, the flour is thermally dehydrated. However, other dehydration methods (such as freeze-drying, solvent extraction and microwave treatment) can be used.

The temperature at which the flour is dehydrated is referred to as the dehydration temperature. It is preferred that for the dehydration step, the flour be heated at a temperature below the gelatinization temperature of the flour. Thus, in one embodiment, the temperature of flour is below the gelatinization temperature during the duration of dehydration. However, it will be recognized that a transient and slight increase in temperature above the gelatinization temperature would not be sufficient to result in gelatinization. Therefore, in another embodiment, the flour is heated such that the temperature of flour is not significantly higher than the gelatinization temperature for a period of more than 5 consecutive seconds. By "not significantly higher than the gelatinization temperature" it is meant a temperature which is not more than 5% higher than the gelatinization temperature. It is preferable to rapidly raise the temperature of the flour to a temperature at which the flour is dehydrated without the flour reaching the gelatinization temperature.

In one embodiment, after dehydration there is no detectable gelatinization in the flour as determined by birefringence and the flour exhibits one or all of the improved properties discussed herein.

After the flour has been dehydrated, the flour is subjected to further heating. In one embodiment, there is no additional moisture loss from the flour during the further heating step. In another embodiment, the further heating is carried out without substantial moisture loss. By "without substantial moisture loss" it is meant that additional moisture loss is less than 2% by weight of the product; and preferably, less that 1%; and more preferably, less than 0.5%. However, the moisture content should not fall to below 1.5% during the heating step. For the sake of clarity, if the moisture content of the flour after the dehydration step is 4%, the moisture content of the flour after the further heating step is not less than 2%; and preferably, not less than 3%; and more preferably, not less than 3.5%. If the moisture content after dehydration is 2%, the moisture content after the further heating step is not less than 1.5%. Because the heating step is carried out at a temperature of 330° F. or less and the moisture content of the dehydrated flour is 4.1% or less, no gelatinization is expected to occur during the heating step. Thus, in one embodiment, the dehydrated flour is not gelatinized during the heating step.

The heating step contributes to increasing the water absorptive capacity of flour. Without intending to be bound by any particular theory, it is considered that the water absorptive capacity is increased, at least in part, due to denaturation of proteins and/or modification of the starch granules in the flour. By "denaturation" it is meant that the protein structure (e.g., secondary and/or tertiary structure) is modified (i.e., altered). While most of the protein denaturation occurs during the heating step, some protein denaturation may occur during the dehydration step. It is considered that while the starch granules remain intact and discernable, during the heating step the structure of the starch granules is altered such that previously latent water binding domains become available to absorb water.

In one aspect, the present invention provides a method for heat-treating flour comprising the steps of: a) providing a flour; b) thermally dehydrating the flour, such that the moisture content of the flour is reduced to 1.5 to 4.1%, and where the flour is not gelatinized during the dehydration step; and c) heating the dehydrated flour to obtain a heat-treated flour such that the moisture content of the flour does not go below 1.5% during this heating step. In the heat-treated flour at least 7% of the total proteins in the heat-treated flour are denatured. The heat-treated flour exhibits an increase in moisture absorption of at least 3.0% relative to untreated flour. In one embodiment, the method consists essentially of steps a), b), and c). In another embodiment, the method consists essentially of steps a), b), c) and step d) which is addition of water to the heat-treated flour to increase the moisture content of the heat-treated flour (e.g., to 6-10%). In yet another embodiment, the method consists of steps a), b), and c) or steps a), b), c) and d).

The dehydration step and the heating step can be carried out as a combined heat-treatment process (e.g., dehydration and heating are carried out in a single unit operation) or can be carried out as discrete steps (e.g., dehydration and heating are carried out in as two unit operations). When the steps are carried out in a combined heating process, the flour can be introduced into an enclosure (apparatus) and subjected to a certain temperature for a certain period of time such that dehydration (to reduce the moisture to 1.5 to 4.1%) occurs with no or minimal gelatinization. Then the dehydrated flour continues to be heated in the same enclosure (at the same or a higher temperature). When carried out as discrete steps, the flour can be first dehydrated under conditions where the flour is rapidly dehydrated (such as in a flash dryer) to reduce the moisture to 1.5 to 4.1%, and then the dehydrated flour can be heated in the same or a different enclosure (apparatus). For example, a heat exchanger can be used to heat the flour, after it has been dehydrated in co-current air flow dryer. If the heating step is carried out in the same apparatus, the steps can be run consecutively (the flour may be allowed to cool between the steps) or the steps carried our in a combined process. If the process is carried out as discrete steps, the flour can be allowed to cool (and stored if desired) between steps or the flour can be immediately transferred (without any intervening step and without allowing the flour to cool to a significant extent) to the next step.

In one embodiment, the dehydration step is carried out as a discrete step in a co-current air flow dryer (also referred to herein as a flash dryer) with a product (flour) exit temperature (temperature of the flour measured as it exits the flash dryer) of between 180° F. to 245° F., including all integers between 180° F. to 245° F. In one embodiment, it is preferable that the product exit temperature be 205° F. to 225° F. The residence time, the time the flour is in the flash dryer, is from 5 to 20 seconds, including all integers between 5 and 20 seconds. During this dehydration step, the moisture content is reduced to between 1.5 and 4.1%, including all integers and all values to the tenth decimal place between 1.5 and 4.1%. In the flash dryer the flour is introduced into the dryer as dispersed flour granules (so as to increase the effective surface area of the flour) carried in a co-current flow air stream. The co-current air flow dryer is an example of a direct, dynamic heating system. By "direct" it is meant that the flour is heated by contact with independently heated air. By "dynamic" it is meant that the flour is exposed to a continuous flow of air and not a static mass of air in a closed system, such as in a cabinet-type dryer (e.g., an oven) which is an example of a static system.

In one embodiment, the heating step is carried out as a discrete step in a jacketed heat exchanger. For example, the heating step can be carried out in a heat exchanger (such as a Solidaire® heat exchanger) having a jacket temperature of 260° F. to 330° F., including all integers between 260° F. to 330° F. The flour is heated for 2 to 6 minutes, including all integers between 2 and 6 minutes. This is an example of an indirect heating system. By "indirect" it is meant that the flour is heated by the heat supplied to the flour via a heating medium circulated in a jacketed heat exchanger.

In one embodiment, the dehydration and heating steps are carried out as a combined process in a static system. For example, the process can be carried out in a convection oven (such as a lab scale rack oven and the like). Examples of the process where the combined dehydration and heating steps are carried out in a static system include, but are not limited to, heating the flour at 290 to 330° F. for 2 to 20 minutes, including all integers between 290 and 330° F. and 2 and 20 minutes, in a convection oven. Preferably, the flour sample is heated at 295 to 325° F. Preferably, the combined process is carried out for 2-8 minutes, including all integers between 2 and 8 minutes, and more preferably for 3 to 5 minutes. In one embodiment, the flour is heated at 290° F. for 5 minutes. In another embodiment, it is heated at 320° F. for 3 minutes. Flour heat treated to temperatures greater than 350° F. for 3 minutes or more in a combined heat-treatment process resulted in flour with undesirable properties.

In one embodiment suitable for a large-scale industrial process, the flour is dehydrated using a co-current air flow dryer, and the dehydrated flour is heat treated using a Solidaire® heat exchanger.

Generally, for industrial scale heat treatment (e.g., heat-treating greater than 10 pounds of flour per hour) the dehydration step is carried out as a discrete step under rapid dehydration conditions (such as in a flash dryer). For large scale heat treatment, it was found that carrying out both the dehydration and heating steps in a static atmosphere apparatus (such as a Solidaire® heat exchanger) at temperatures less than 290° F. or in a dynamic heating apparatus (such as a flash dryer) at high temperatures (e.g., 270° F.) resulted in flour with poor baking performance (see Example 8). In small scale (i.e., lab scale) (e.g., heat-treating less than 10 pounds of flour) heat treatment, combining the dehydration and heating steps in a combined process in convection oven, thereby reducing the moisture content of the flour to, for example, from 12.3% to 4.1-1.5% in less than one minute, was found to provide flour with improved properties similar to those realized in the large-scale, two-step process. In the case of heat treatment in a static, cabinet-type dryer, temperatures were generally higher that those used in large-scale, two-step processes. While not intending to be bound by any particular theory, it is considered that the different heating protocols required for lab scale versus industrial scale processes are at least in part due to different mass of air to mass of flour ratios and different heating environment (static vs. dynamic) of a typical lab scale oven as compared to the drying apparatuses typically used in industrial scale processes.

In one embodiment, for a two unit operation process, a dehydration step is carried out in a co-current air flow dryer at a temperature of 180 to 245° F, including all integers between 180 and 245° F, and preferably 205 to 225° F, including all integers between 205 and 225° F, with the flour having a resident time in the oven of from 5 to 20 seconds, including all integers between 5 and 20 seconds. The dehydrated flour is then subjected to heating in an indirect heating apparatus (such as a jacketed heat exchanger) at a jacket temperature of 260 to 330° F., including all integers between 260 and 330° F., and preferably 290 to 325° F, including all integers between 290 and 325° F., for a period of 2 to 20 minutes, including all integers between 2 and 20 minutes, and preferably 2 to 6 minutes, including all integers between 2 and 6 minutes. The product (flour) temperature exiting the heat exchanger (exit temperature) is 245 to 320° F., including all integers between 245 and 320° F., and preferably 270 to 305° F., including all integers between 270 and 305° F. The moisture content of the flour is then increased to from 6 to 10% and a water activity ($A_W$) of 0.30 to 0.35.

In another embodiment, for a one unit operation (combined) process, the flour is heated in a convection oven at 290 to 330° F. for 2 to 20 minutes, including all integers between 290 and 330° F. and 2 and 20 minutes. Preferably, the flour sample is heated at 295 to 325° F., including all integers between 295 and 325° F. Preferably, the combined process is carried out for 2 to 8 minutes, including all integers between 2 and 8 minutes, and more preferably for 3 to 5 minutes, including all integers between 3 and 5 minutes.

In one embodiment, the invention comprises providing a flour having a moisture content of between 1.5 and 4.1%, and heating the flour in a jacketed heat exchanger (such as a Solidare® heat exchanger) at a temperature of 260 to 330° F. for a period of 2 to 20 minutes, and preferably 2 to 8 minutes.

The flour can be heated in any of the methods recognized by those skilled in the art including, but not limited to, batch and continuous flow methods. Examples of apparatuses useful in the present invention include, but are not limited to, industrial ovens, conventional ovens, microwave ovens, fluidized beds, dextrinizers, dryers, mixers and blenders equipped with heating devices, and other types of heaters, provided the apparatus is fitted with a vent to the atmosphere so that moisture does not accumulate and precipitate onto the flour. For example, a rotary drum dryer is used in a continuous flow configuration to practice the method of the present invention. Such dryers are commercially available.

Typically, a dynamic heating apparatus with an air mass/volume: flour mass/volume ratio of greater than 1, and preferably greater than 5, is suitable for dehydrating flour. Examples of dynamic heating apparatuses which can be used to rapidly dehydrate flour according to the present invention include, but are not limited to, co-current air flow dryers, rotary dryers, bin dryers, silo dryers, tower dryers, tunnel dryers, conveyor-belt dryers, Yamato® dryers, fluid bed dryers, pneumatic/flash dryers, and agitated dryers.

Examples of static heat exchangers that can be used for heating the dehydrated flour to increase the moisture absorption of the flour include, but are not limited to, tubular heat exchangers (such as a Solidaire® heat exchanger), direct-heat exchangers and refractive dryers.

Generally, apparatuses suitable for heat-treating flour in a combined (dehydration, heating) process have a mass/volume of air which is much greater than the mass/volume of flour. Typically, such a static heating apparatus has an air mass/volume: flour mass/volume ratio of greater than 9, and preferably greater than 200. Examples of static heating apparatuses that can be used for heating-treating the flour in a combined process include, but are not limited to, any cabinet-type dryer or convection oven (e.g., any typical laboratory oven) and the like.

In one embodiment, no extraneous moisture is added to the atmosphere in which the flour is heated. At the heating temperatures of the present invention the relative humidity of the atmosphere is 2% or less.

The moisture content of the flour after heat treatment is between 1.5 to 4.1%. Typically, after cooling the heat-treated flour has a moisture content of at least 2%. This can be increased to a desired level. For example, the moisture content of the heat-treated flour can be increased to 6-10%, such that the water activity is from 0.15 to 0.55, and all values to the hundredth decimal between 0.15 and 0.55, and preferably, 0.25 to 0.45 and 0.30 to 0.35, and more preferably 0.33. For example, after heating, the flour can be exposed to an atmosphere comprising water vapor, such that the desired moisture content is obtained.

In one embodiment, additives can be added to the flour before, during and/or after the heat treatment. If added after the heat treatment, the additives can be added before or after the flour has cooled down. Examples of such additives include, but are not limited to, vitamins, minerals, salts, flavors and enzymes.

The heat treatment of the present invention results in at least 7.0% of the protein in the flour being denatured, as determined by the amount of acid soluble protein measured by the gluten denaturation test described by Orth and Bushek, Cereal Chem., 49:268 (1972). This test measures denaturation of gluten by measuring the loss of protein in dilute acetic acid. In one embodiment, 7.0% to 13.0% of the protein, including all integers and values to the tenth decimal place between 7.0% and 13.0%, is denatured. In various embodiments, 7.0, 7.5, 8.0, 8.5, 9.0, 9.5, 10.0, 10.5, 11.0, 11.5, 12, 12.5, and 13.0% of the protein is denatured. "Protein" as used herein refers to all proteins present in the flour. Generally, gluten-forming proteins (e.g., gliadin and glutenin) are the predominant proteins in flour, in some cases comprising 80% or more of the total protein in the flour.

The dehydrated and heating processes described herein result in flour, which after heat treatment, has a moisture content of between 1.5% to 4.1%, and preferably 1.5% to 3.6%; water activity ($A_W$) of from 0.03 to 0.10; and protein which is at least 7.0% denatured compared to the protein of the untreated flour. It was observed that if the protein denaturation was less than 6%, the flour did not produce dough having desirable quality and/or performance.

The process described herein results in flour with a particle size distribution which is different from the particle-size distribution of flour which has not been so treated. In one embodiment, the heat-treatment process described herein results in flour in which at least 80% of the particles are between 90 and 150 microns in size. In another embodiment, at least 80% of the particles are between 90 and 150 microns in size and at least 7% of the particles are between 150 and 250 microns.

The heat-treated flour has a decreased microbial load relative to untreated flour.

In another aspect, the present invention provides heat-treated flour produced by the processes described herein. In yet another aspect, the present invention provides a composition comprising flour having a moisture content, $A_W$, denatured protein content, and particle size as described herein. In one embodiment, the invention provides heat treated flour having a moisture content of 6-10%, $A_W$ of 0.25 to 0.45, preferably 0.30 to 0.35; denatured protein level of 7 to 13%. In another embodiment, the invention provides heat treated flour having a moisture content of 6-10%, $A_W$ of 0.25 to 0.45, preferably 0.30 to 0.35; denatured protein level of 7 to 13%, and particle size of at least 80% of the particles to be between 90 and 150 microns.

The types of flour useful in the present invention include those based on cereal grains. Examples include, but are not limited to, whole wheat, soft or hard wheat, durum wheat, barley, rice, and potato flours, and mixtures thereof. Both flour with gluten-forming proteins (e.g., wheat flour) and flour without gluten-forming proteins (e.g., rice, tapioca and potato flour) is useful in the present invention. Flour of any grade or flour or meal obtained at any stage of the milling process can be subjected to heat treatment according to the present invention. The findings of the present invention as discussed herein (e.g., improved water absorption properties of heat-treated flour and desirable baking properties of doughs made from heat-treated flour) can be applied to any dry powdered/milled organic substance that contains protein and requires hydration for functionality.

Flour subjected to heat treatment according to the present invention can be used to make dough. The dough may or may not be frozen. An example of a dough useful in the present invention includes flour, water, leavening agent which may be yeast or chemical leavening agent or both, and, optionally, one or more additional ingredients including for example, iron, salt, stabilizer(s), flavored oils, enzymes, sugar, niacin, at least one fat source, riboflavin, corn meal, thiamine mononitrate, flavoring(s), and the like.

In one example, dough of the present invention comprises 7-14% compressed yeast; 1-6% high fructose corn syrup; 0.2% dextrose; 0.5 to 2% oil; emulsifiers, stabilizers and water. Dough compositions and methods are known in the art. A dough formulation and method are described in U.S. patent application Ser. No. 11/641,300, which dough formulation and method are incorporated herein by reference.

The present invention provides flour with improved properties. These improved properties include properties of the flour itself, properties of dough (including frozen dough) made from the heat-treated flour, and baking properties of the dough (including frozen dough). These improved properties include, but are not limited to, increased moisture absorption, increased farinograph quality numbers, decreased adhesiveness, decreased stickiness and decreased cohesiveness. These improved properties are discussed in Examples 3-14. In manufacturing processes decreased stickiness is advantageous in that processing throughput is increased as less material sticks to the manufacturing equipment. For example, high moisture dough prepared heat-treated flour can be processed.

In one example, it was observed that one or more of the following: the moisture absorption, farinograph quality numbers, tolerance index and adhesiveness of dough made from heat-treated flour are improved by at least 5, 6, 7, 8, 9 or 10% relative to those same properties in untreated dough. In another example, these properties are improved by more than 10%. Thus, in the heat-treated dough of the present invention, it is preferred that one or more of the properties of water absorption, farinograph quality number, tolerance index or adhesiveness be increased by at least 3, 4, 5, 6, 7, 8, 9, or 10%. Further, heat-treated flour and dough made from same exhibit substantially the same shelf-life properties as untreated flour and dough made from same.

Baked products prepared from heat-treated flour of the present invention have desirable properties (e.g., baked specific volume) relative to those prepared from flour which has not been heat-treated. For example, baked products made from heat-treated flour with 10 to 12% protein have greater baked specific volume than those made with untreated flour with the same protein content.

In one aspect, the present invention provides a baked product prepared from dough made from heat-treated flour. In one embodiment, the baked product has the same or higher baked specific volume and lower percent solids compared to a baked product made from untreated flour which contains up 15% less protein.

In another embodiment, the baked specific volume (BSV) of a baked product prepared from dough made from heat-treated flour with a protein content of 10 to 12% is increased by at least 5% relative to a baked product made from dough prepared with flour which has not been heat treated.

One aspect of the present invention is to subject flour to heat treatment thereby improving its performance so that it performs (e.g., in dough forming and baking) like higher-protein content flour (see Example 3). For example, it was observed that when flour having a protein content of 11.3% was subjected to heat treatment according to the present invention, its performance was comparable to that of flour having 12.4% protein (see Example 10). Without intending to be bound by any particular theory, the improved performance of the heat-treated, low-protein flour is attributable to improvements in the properties of the flour described herein.

In another aspect, a lower amount of heat-treated flour can be used relative to non-heat-treated flour (with the same protein content) to achieve the improved performance. For example, baked products made with heat-treated flour (with a protein content of 10% to 12%) have an increased BSV and decreased total solids (due to increased water absorption) relative to flour with the same protein content. As another example, baked products made with heat-treated flour (with protein content greater than 12%) have a comparable BSV and decreased total solids relative to flour with the same protein content.

In yet another aspect of the present invention, flour made from seasonally varied cereal grains is heat treated such that the heat-treated flours provide similar baking performance.

In one embodiment, a baked product prepared from heat-treated dough of the present invention performs similar to a baked product made from untreated flour which contains up to 15% less protein. In another embodiment, the baked product made from heat-treated dough has the same or higher baked specific volume and lower percent solids compared to a baked product made from untreated flour which contains up to 15% less protein. In yet another embodiment, the baked product made from heat-treated dough has the same or higher baked specific volume and lower percent solids compared to a baked product made from untreated flour which contains 3, 4, 5, 6, 7, 8, 9, 10, 11, 12, 13, 14 or 15% less protein.

The following examples are presented to illustrate the present invention. They are not intended to limiting in any manner.

EXAMPLE 1

This example describes the heat treatment of flour in a rack oven. Using a mesh bowl, flour (150 g) was sifted onto a metal tray (62 cm×42 cm) with a thickness of approximately 0.1 cm. Two metal trays were heated simultaneously in a convective hot air rack oven. Given the low specific heat of flour (1.4 to 1.8 J/g·° C.), the large heating surface area (2,604 cm$^2$), small mass (150 g), and large surface heat transfer coefficient in a convective hot air rack oven (approximately 100 W/m$^{2 \cdot \circ}$ C.), the flour temperature would reach oven temperature in under one minute. After treatment, the trays were immediately removed from the oven and placed on a table to cool. After cooling, the flour was transferred into plastic containers, and stored at room temperature until further use.

EXAMPLE 2

Flour heat treated as described in Example 1 was used for further studies to determine the effect of heat treatment on water absorption, sheetability, and baking quality. Variation in water absorption of flour during dough formation was monitored using a farinograph (Brabender, Inc.). Our results indicate that a well-controlled heat treatment results in unexpected and increased water absorption and increased stability time. The time-temperature combinations used were temperatures from 255-330° F. and times from 1-20 minutes. The results indicate temperatures below 255° F. require too long a treatment time for practical applications. Temperatures above 330° F. resulted in off-flavors and dough prepared using such heated flour performed poorly. Flours at 3 different protein levels (13.0, 12.4, and 11.9%), were heated at three temperatures (260, 290, and 320° F., with oven control variability of +8° F. and −2° F.) for at least 4 treatment times depending on the protein content of the flour.

A 300-g mixing bowl Farinograph-E (Brabender® OHG, Duisburg, Germany) was used to evaluate water absorption of flour and to determine stability and other characteristics of doughs during mixing. An AACC method (54-21) was followed for analysis with a slight modification. Temperature of mixing used in our study was 21° C. as compared to 30° C. in the published method. A lower temperature of mixing was used to simulate dough mixing for frozen dough manufacturing. As all the flour samples were tested at 21° C., the results for different flours should be comparable regardless of the modification in the test procedure. Flour samples were analyzed for moisture content using Ohaus moisture analyzer (Switzerland). The moisture analyzer was equipped with a halogen lamp to evaporate moisture from the sample and measure moisture loss. Flour samples were stored in a closed container to prevent moisture evaporation until analysis. The thermostat and circulating pump was turned on at least 1 hour prior to using the instrument. The buret was filled with deionized water at room temperature. The test program was set up with the following parameters as input: Mixer size: 300 g;

evaluation: AACC; consistency: 500 Brabender units (FU); time of testing: 20 minutes (longer, if needed); speed: 63 rpm. The amount of flour added to the mixer bowl was calculated based on the moisture content of the flour. The calculations were done such that amount of dry solids added to the mixer bowl was similar to the one obtained by adding 300 g of 14%-moisture flour. The bowl was covered with a glass plate to prevent evaporation. The mixing was continued for about 20 minutes or longer, if needed.

At the conclusion of the test, a farinograph (depicting Torque (BU) vs. time) is obtained (FIG. 1). A farinograph is a curve between Torque units (BU) vs. time. The curve is analyzed and results are expressed as:

Water absorption: given as two values:
1. Water absorption corrected for the desired consistency of 500 BU.
2. Water absorption corrected for the desired consistency and for the moisture base of 14%.

Development time: the time between test start (addition of water) and the point of the torque curve just before weakening begins.

Stability: the time between the first and second intersecting point of the upper trace of the torque curve with the consistency line.

Tolerance index (MTI): the difference in Brabender units (BU) from top of curve at peak to top of curve measured at 5 minutes after the peak is reached.

Time to breakdown: the time from start of mixing until there has been decrease of 30 units from peak point.

Farinograph quality number: the point of the curve in which the curve has decreased by 30 FU after the maximum. This number is a measurement for flour quality. Poor flour weakens early and quickly and corresponds to low quality number; whereas strong flour weakens late and slowly exhibiting a high number.

The term "dough strength" as used herein refers one or more of the following attributes: tolerance index, farinograph quality number, and the like.

EXAMPLE 3

This example describes the increased sheetability of the present dough by measurements of dough stickiness, adhesiveness and cohesiveness. SMS Chen-Hoseney Dough Stickiness Rig in conjunction of TAXT2 (Stable Microsystems Ltd., Surrey, UK) was used for measuring dough stickiness, adhesiveness, and cohesiveness. The method has been extensively used to investigate dough stickiness due to overmixing, addition of excess water, overactivity of proteolytic enzymes, difference in wheat varieties and composition.

Dough samples were prepared using flour, water, yeast, salt, and other minor ingredients (such as enzymes, dough conditioners, etc.). Type of flour and amount of water used in the dough was varied in order to obtain following 6 treatments: untreated flour with 5, 8, and 10% additional water (on flour basis); and treated flour with 5, 8, and 10% additional water (on flour basis). Additional water means water that was added in excess to the recommended water content in the formula. The treated flour was conditioned to moisture content similar to the untreated flour to avoid any artifacts due to the differences in initial moisture content of flours. Each dough sample was prepared and analyzed for adhesiveness, within 10 minutes of conclusion of dough-mixing.

Before using the cell, the internal screw was rotated to move the piston and increase the sample chamber to its maximum capacity. A small quantity of prepared dough was placed into the chamber and the excess dough was removed with a spatula so that it is flush with the top of the chamber. The internal screw was then rotated to extrude a small amount of dough through the holes. This first extrusion was removed from the lid surface using a spatula. The screw was once again rotated to extrude a 1 mm high dough sample. A cap was placed over the exposed sample surface to minimize moisture loss, whilst allowing the prepared dough surface to rest for 30 seconds to release the stress produced by extrusion. Thereafter, the cover was removed and placed on the cell directly under the 25 mm cylinder probe that was attached to the load cell. The test was commenced using the following parameters: Pre-Test Speed: 2 mm/sec; test speed: 1 mm/sec; post-test speed: 10 mm/sec; distance: 5 mm; force: 40 grams; time: 0.2 second; trigger type: auto −5 gram. The dough can then be removed from the lid surface using the spatula; and extruded again to repeat the test, as stated above.

Figure 2:
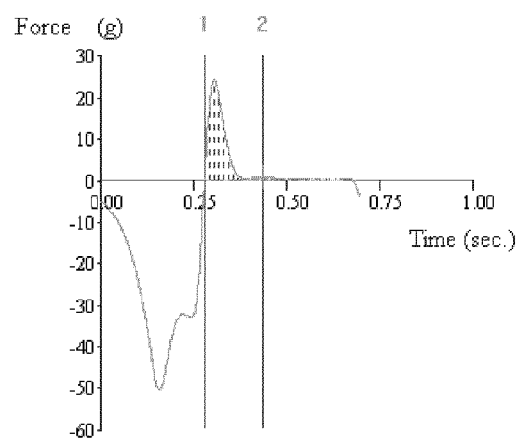
FIG. 2. An example of a force vs. time plot for dough.
Figure 3:
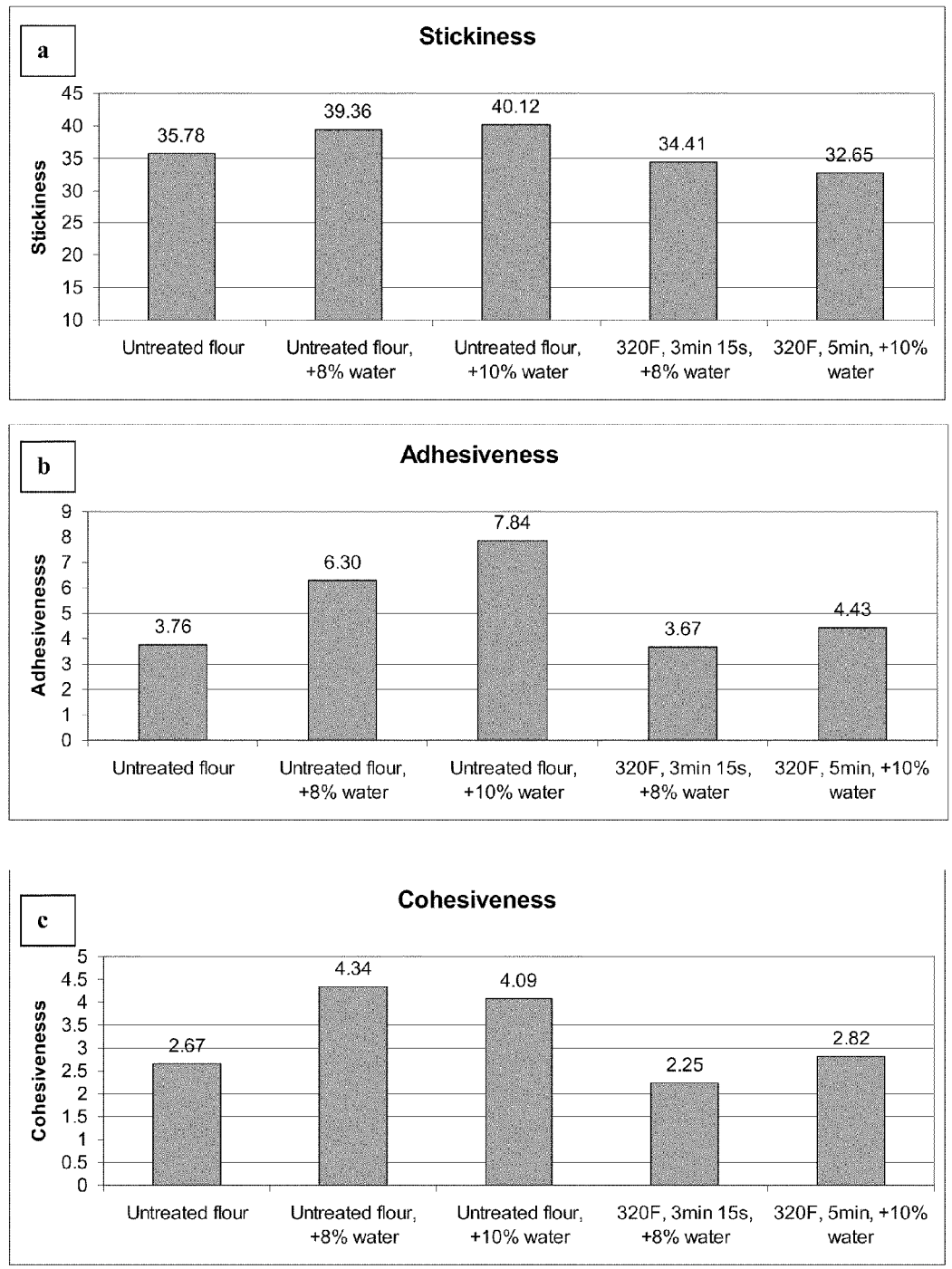
FIG. 3. a) Stickiness, b) adhesiveness and c) cohesiveness data for a dough prepared from heat-treated flour.

A typical force-time plot for the analysis is shown in FIG. 2. The values of particular interest for sample evaluation can be automatically obtained by routine software. The maximum force reading, i.e. highest peak at marker 1, the positive area and the distance between the markers 1 and 2, are all indicators of the rheological properties of the dough. Stickiness is measured as the maximum force at marker 1. Work of adhesion (adhesiveness) is calculated as the area under the curve between markers 1 and 2 (as shown using the shaded part). Cohesiveness or dough strength is measured as the distance between marker 1 and 2. As seen in FIG. 3, for untreated flour doughs, adhesiveness increases with increasing hydration from 5 to 8 to 10%. Treated flour doughs have lower adhesiveness than untreated doughs.

EXAMPLE 4

This example provides examples of the improved properties of flours heat-treated by a combined heating process in a rack oven.

Breads baked using flour of 12.4% protein content with 5% and 8% increased water absorption (that had been heat treated in a combined dehydration and heating process). Both sets of breads were evaluated based on its baking performance.

TABLE 1

Application to lower protein flour to improve its quality as defined by Farinograph parameters

|  | Regular flour (12.4%) | Lower protein flour (11.9%) | Treated lower protein (11.9%) flour | |
| --- | --- | --- | --- | --- |
|  |  |  | 290° F.; 7 minutes | 320° F.; 4 minutes |
| Moisture (%) | 12.0 | 9.5 | 2.3 | 3.6 |
| Absorption (500 BU) | 68.6 | 66.5 | 80.0 | 76.1 |
| Absorption (14% moisture) | 63.2 | 61.5 | 68.0 | 65.3 |
| Stability (minutes) | 13.0 | 9.8 | 12.7 | 12.6 |

TABLE 1-continued

Application to lower protein flour to improve its quality as defined by Farinograph parameters

|  | Regular flour (12.4%) | Lower protein flour (11.9%) | Treated lower protein (11.9%) flour | |
|---|---|---|---|---|
|  |  |  | 290° F.; 7 minutes | 320° F.; 4 minutes |
| Development time (minutes) | 8.5 | 6.7 | 9.4 | 7.7 |
| Tolerance index (BU) | 42.0 | 54 | 47.0 | 37.0 |
| Time to breakdown (minutes) | 12.5 | 9.8 | 12.3 | 12.3 |
| Farinograph quality no. | 125.0 | 98 | 123.0 | 123.0 |

The data in the table above and in FIGS. 4 and 5 were obtained using the experimental procedures discussed in Example 2. In FIG. 4, the stability and farinograph quality number observed for 12.4% protein flour heat-treated at 290° F. for 8 minutes are increased relative to flour treated for 5 minutes. At 320° F., flour treated for 4 minutes shows higher stability and farinograph quality numbers relative to that for flour treated for 2 minutes. At these temperatures, similar trends are observed for the other measured parameters shown in FIG. 4. Also, absorption (14% moisture) increases with increasing heat treatment time for a given temperature.

Flour with protein content ranging from 10.9% to 13.1% were heat-treated and the farinograph data shown in FIG. 5. Generally, dough made from low protein heat-treated flour has comparable stability and absorption to dough made from higher protein untreated flour.

EXAMPLE 5

This example shows protein denaturation as measured by acid soluble fraction. The data in Table 2 were obtained using the testing protocol described in Orth and Bushk, Cereal Chem., 49; 268 (1972).

TABLE 2

Percentage Reduction in Acid Soluble Protein

| Sample Name | % Reduction | Farinograph absorption increase (%) |
|---|---|---|
| 1 - Untreated flour | Control sample | — |
| 2 - 320° F.; 2 minutes | 4.7 ± 0.02 | 0.5 |
| 3 - 320° F.; 3 minutes, 15 seconds | 7.9 ± 0.06 | 4.5-5 |
| 4 - 320° F.; 5 minutes | 12.2 ± 0.03 | >8 |

EXAMPLE 6

This example describes particle size properties of the flour heat treated as follows. Sample A is heat treated only in a Solidaire® heat exchanger at 275° F.; Sample B is an untreated control sample; and Sample C is heat treated according to the present invention (dehydration in a flash dryer at 220° F. for 10 seconds, followed by heat treatment in a Solidaire® heat exchanger (270° F. jacket temperature; 248° F. internal temperature) for 2.7 minutes.

TABLE 3

| Mesh size (μm) | A | B | C |
|---|---|---|---|
| 250 | 0.17 ± 0.1 | 0 ± 0 | 0 ± 0 |
| 150 | 36.05 ± 0.07 | 0.71 ± 0.44 | 8.35 ± 0.21 |

TABLE 3-continued

| Mesh size (μm) | A | B | C |
|---|---|---|---|
| 90 | 62.51 ± 0.3 | 64.64 ± 1.92 | 86.745 ± 3.17 |
| 38* | .27 ± 0.33 | 34.5 ± 1.77 | 4.5 ± 2.9 |

*Flour that fell through mesh 38 is included in this value

The size of the flour granules was observed to be different for the various samples.

The values in Table 3 were determined by placing a flour sample on an appropriate mesh size screen. The value in Table 3 is the percentage of flour that remained on the screen.

EXAMPLE 7

This example describes microbiological analysis of the heat-treated flour. The microbiological analyses were carried out using standard protocols. The heat-treated flour was 12.4% protein flour heated for 290° C. for 5 minutes in a rack oven.

TABLE 4

Microbiological analysis of flour

| # | Sample | Standard Plate Count (CFU/gm) | Coliform Count (CFU/gm) | Yeast Count (CFU/gm) | Mold Count (CFU/gm) |
|---|---|---|---|---|---|
| 1 | Control flour | 2700 | 30 | 200 | 150 |
| 2 | Heat-treated flour | 120 | <10 | <10 | 10 |

EXAMPLE 8

This example describes some properties of baked products prepared from the heat-treated flour.

TABLE 5

|  | Crust (% moisture) | Crumb (% moisture) |
|---|---|---|
| Bread made from treated flour | 18.8% | 42.6% |
| Bread made from untreated flour | 16.5% | 39.7% |

These data show that the % moisture in the bread baked from heat-treated flour is higher (lower % solids) than the one made with untreated flour.

EXAMPLE 9

This example describes the frozen-dough shelf life of French bread made with heat-treated flour and untreated flour using flour of 12.4% protein (i.e., regular protein). Compared to the treated flour, the untreated flour products were flatter.

TABLE 6

| Treatment | Days | |
|---|---|---|
| | 60 | 100 |
| Untreated flour with 5% additional water | BSV 5.11 | BSV 4.17 |
| Heat-treated flour with 5% additional water | 5.99 | 4.93 |

Figure 7:
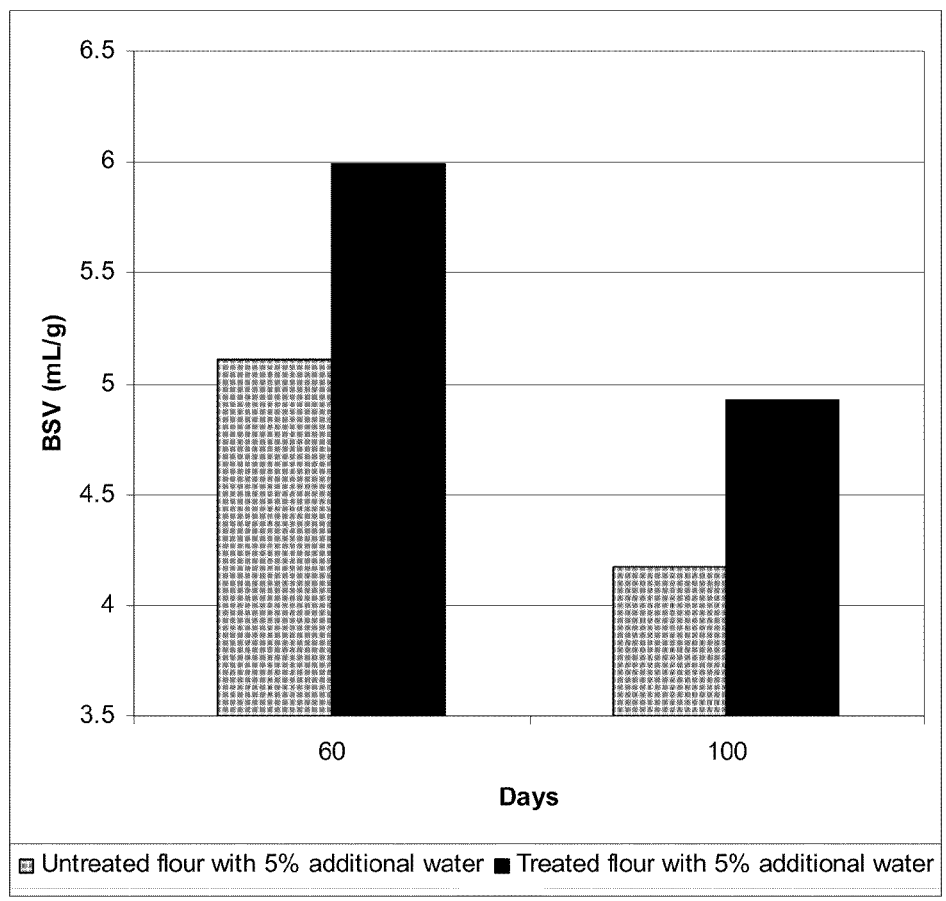
FIG. 7. Plot of baked specific volume (BSV) vs. time for baked products made from heat-treated flour.

The baked specific volume (BSV) (mL/g) of the product made from a frozen dough sample was higher than the control (see data in Table 6 and FIG. 7). Both samples had similar water in the formula. Higher water leads to bigger ice crystals that are detrimental to yeast cells and dough/gluten structure. Heat treatment was successful in holding the water in a form that it was not available for crystal formation and hence showed higher volume and a good profile of the baked product. In control, the water was in-excess of what can be held by the dough matrix, and hence showed lower volume and flatter profile.

EXAMPLE 10

This example demonstrates that the baking performance of lower protein flour can be improved by heat treatment to that of higher protein flour.

Three (3) batches of bread were manufactured using sponge-dough methodology:

Batch 1: 12.4% protein flour, enriched, untreated with 63% absorption in the formula;

Batch 2: 11.3% protein flour, enriched, untreated with 58% absorption in the formula; and Batch 3: 11.3% protein flour, enriched, treated (290° F., 6 min) with 63% absorption in the formula.

Sponge dough was made using flour, water, yeast, and SSL; and incubated for 2 hours, 30 minutes. After incubation sponge was mixed with flour, water, salt, sugar, non-fat dry milk, shortening, ascorbic acid, and enzymes to form the dough. The dough was divided, shaped, and proofed for 70 minutes. The proofed dough was baked at 375° F. for 13 minutes. The baked product volume (mL), and specific volume (mL/g) has been shown below. Data shows that heat treating the 11.3%—protein flour improved the volume and baked specific volume compared to untreated counterpart and made it comparable to 12.4% protein flour.

TABLE 7

| | 12.4% Untreated | 11.3% Untreated | 11.3% treated |
|---|---|---|---|
| Total volume | 751 | 707 | 747 |
| Baked specific volume | 5.64 | 5.27 | 5.57 |

EXAMPLE 11

This example demonstrates a production heat treatment with two unit operations (dehydration with a flash dryer and heating with a jacketed heat exchanger).

Figure 8:
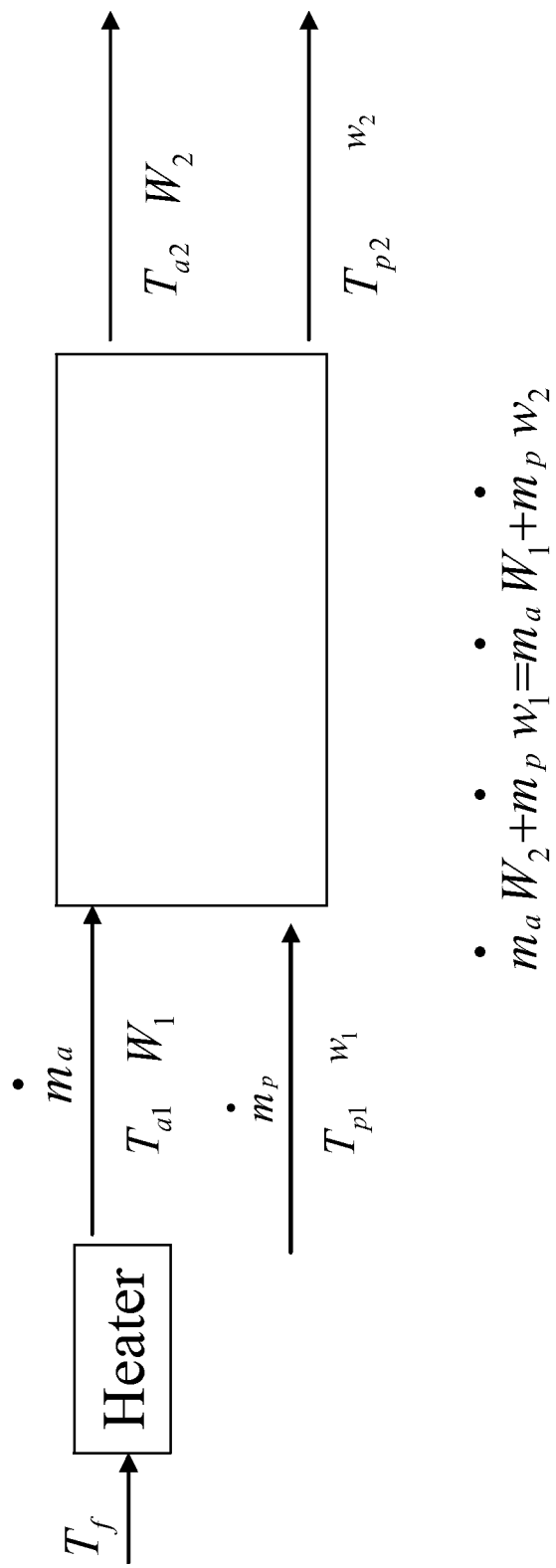
FIG. 8. Graphical representation of co-current flash dryer mass balance configuration for two step heat treatment process.

Flour (12.4% protein, 12.0% moisture content (wet basis or lbs water per lb flour), 13.6% moisture content (dry basis or lbs water per lb dry solids) is dehydrated and followed by a heat treatment. The dehydration is important to lower the flour's moisture content to (1) lower the specific heat of the flour for more efficient t heat treatment at the desired time-temperature conditions, and (2) to have the starch granules remain intact after heat treatment. The temperature at which starch crystallites begin to melt (i.e. gelatinization temperature) for flour at 12% and 8% moisture content (lbs water/lb dry solids) is approximately 320° F., which is within our treatment parameter, and at 3% moisture content increases to 400° F. (Burt and Russell, 1983). The mass balance configuration for this example of co-current flash dryer is provided in FIG. 8. In FIG. 8, $m_a$ is the air flow rate (lbs dry air/hour); $m_y$ is the product flow rate (lbs dry solids/hour); $W_1$ is the moisture content of incoming air (lbs water/lb dry air); $W_2$ is the moisture content existing air (lbs water/lb dry air); $w_1$ is the product moisture content entering the dryer, dry basis (lbs water/lb dry solids); $W_2$ is the product moisture content exiting the dryer, dry basis (lbs water/lb dry solids); $T_{a2}$ is the product moisture content exiting the dryer, dry basis (lbs water/lb dry solids); $T_{a1}$ is the product moisture content exiting the dryer, dry basis (lbs water/lb dry solids).

The feed rate of the flour through the dryer is 220 lbs of dry solids/h. The dried flour contains 2% moisture (lbs water/lb dry solids), so the amount of water to be evaporated in the dryer will be 25.6 lbs water/h. The incoming air to be heated and used to dry the flour product had a dew point temperature of 57° F., a dry bulb temperature of 75° F., a relative humidity of approximately 55%, and the moisture content and the enthalpy of this incoming air was 0.01 lbs water/lb dry air and 28.5 BTU/lb dry air, respectively. The air is heated to 390° F., with the moisture content of the air remaining the same during heating (0.01 lbs water/lb dry air), and the enthalpy of the heated air increase to 112 BTU/lb dry air. The volumetric air flow through the dryer was 355 SCFM (standard cubic feet per minute) and the specific volume of the incoming air is 13.75 cu. ft./lb dry air; thus, the air flow rate is 1,550 lbs dry air/h. The product entered the flash dryer at 80° F., the residence time through the flash dryer was approximately 10 sec. (9-11), and the product exit temperature was 210° F. The air exiting the dryer air had a measured dry bulb temperature of 240° F. From the mass balance equation in FIG. 8, rearranged to solve for the exiting air moisture content, the exit air moisture content was approximately 0.0265 lbs water/lb dry air with a relative humidity of 2.5% (from a psychometric chart). Taking the difference in moisture between the exiting air and incoming hot air, the air removed 0.0165 lb water per lb dry air. Thus, with the air flow rate of 1,550 lbs dry air/h, the rate of water removal is 25.58 lb water/h, similar to what was calculated based on product moisture content entering and exiting the dryer at 220 lbs dry solids/h. Therefore, the quantity of dry air required to dry the flour in this system per lb of dry solids can be calculated by taking the air flow rate (1550 lbs dry air/h) and dividing by the product flow rate (220 lbs dry solids/h), the result is approximately 7 lbs dry air/lb dry solids, which is within the range of 5-10 lbs dry air/lb dry solids of a typical flash dryer. The drying rate of the flour in this flash dryer is very high at 0.695 lbs water/(lb dry solids·min.).

For heat treatment, the dehydrated flour was conveyed to a jacketed heat exchanger having a constant jacket temperature of 290° F. The product cooled during conveying from the dryer (product exit temperature of 210° F.) to approximately 180° F. before entering the heat exchanger. Paddles rotating at 950 rpms move the flour product through the heat exchanger along the inner surface area of the heat exchanger and the angle of the paddles towards the end of the heat exchanger create a plug-flow profile, where the majority of the flour particles have the same residence time of 2.7 min. The product exits the heat exchanger at 270° F. where it is then immediately conveyed and cooled through a bag-house using ambient air. The product exits the bag-house at 115° F.

TABLE 8

Farinograph Flour Property Comparison
with Untreated 12.4% Protein Wheat Flour.

| Measured parameters | No heat treatment | (jacket temp) 290° F., 2.7 min. | Difference |
|---|---|---|---|
| Absorption (500 BU) | 65.5 | 79.9 | 14.4 |
| Absorption (14% moisture) | 63.3 | 68.0 | 4.7 |
| Stability (min) | 15.1 | 27.9 | 12.8 |
| Development time (min) | 12.4 | 28.2 | 15.8 |
| Tolerance index (BU) | 30.0 | 8.0 | −22.0 |
| Time to breakdown (min) | 17.4 | 39.0 | 21.6 |
| Farinograph quality no. | 174.0 | 390.0 | 216.0 |

EXAMPLE 12

This example demonstrates a combined heat-treatment process (dehydration and heating in a cabinet-type dryer (rack oven).

Figure 9:
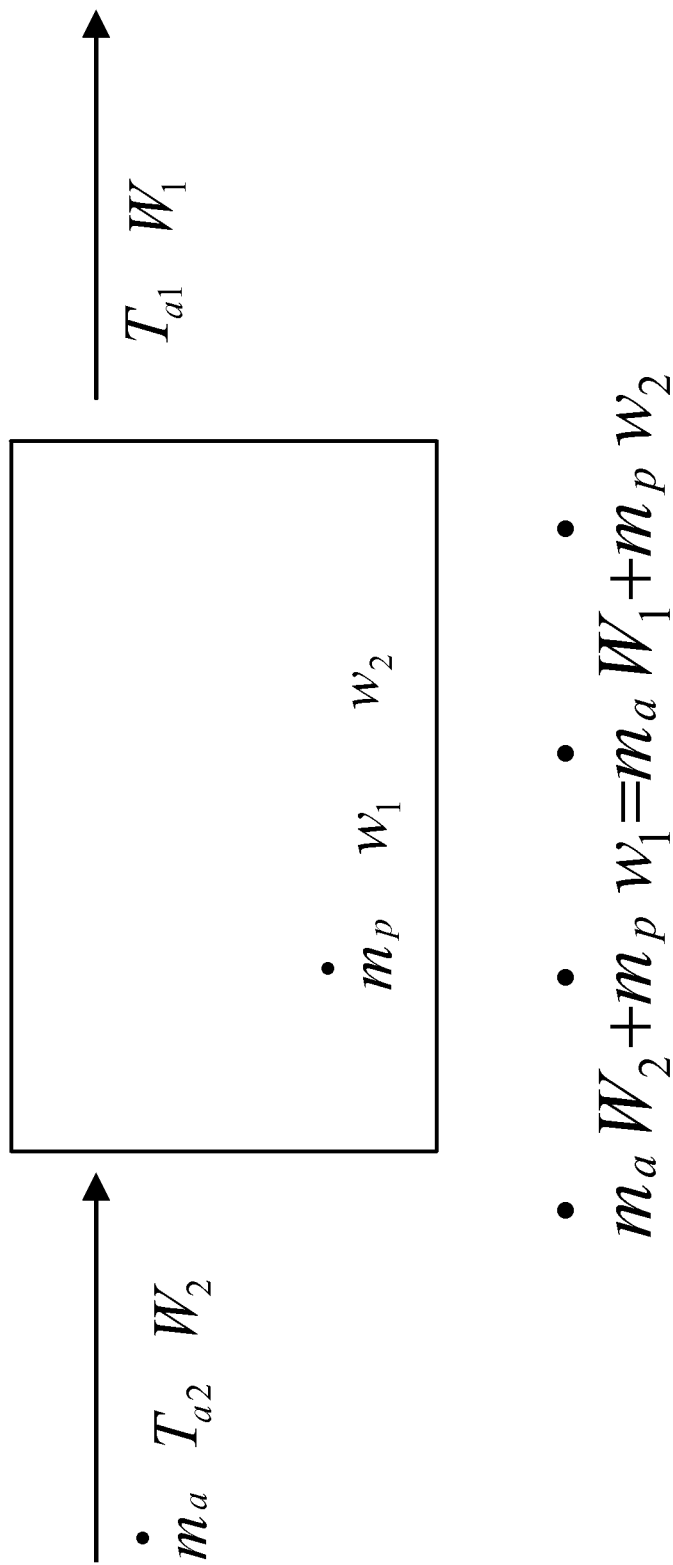
FIG. 9. Graphical representation of rack oven (cabinet-type dryer) mass balance configuration for combined heat-treatment process.

Flour was dried and heated in a rack oven at 290° F. for 5 minutes; the mass balance flow chart is shown in FIG. 9 (the terms are provided in FIG. 8).

Figure 6:
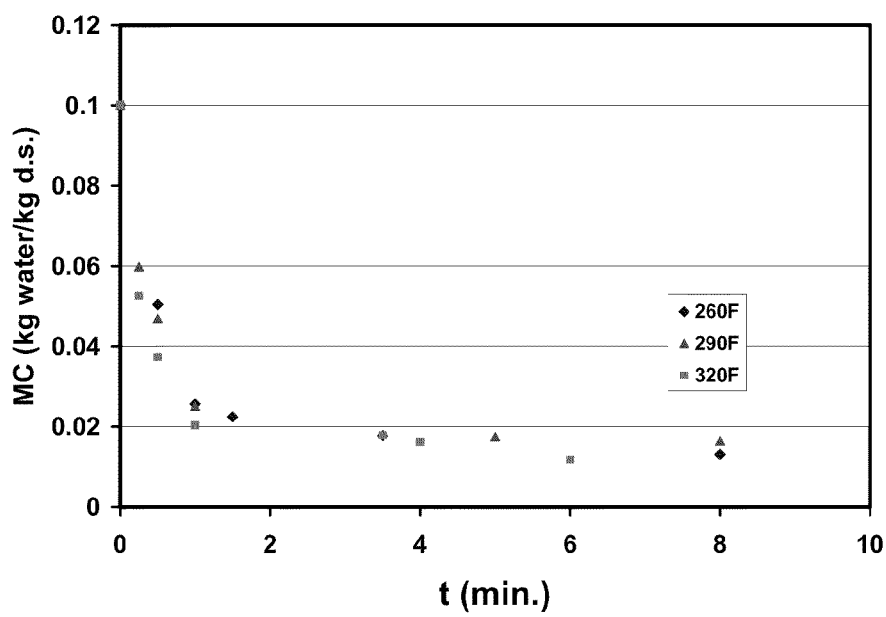
FIG. 6. Graphical representation of drying kinetics of wheat flour at 260, 290, and 320° F. in an oven with air to product ratio of 970 lbs dry air per pound of dry solids.

To maximize the drying and heating rates, thin-film of flour, having initial moisture content of 13.6% (lbs water per lb dry solids) was dusted onto two trays (62 cm×42 cm or 24.4 in.×16.5 in) and approximately 0.1 cm thickness, and the initial flour weight on each tray was approximately 150 g (0.33 lbs). Thus, the total product weight in the oven is 0.66 lbs with 0.58 lbs as dry solids. The incoming air to be heated in the oven had similar conditions as that of the incoming air described for the production [dew point temperature of 57° F., a dry bulb temperature of 75° F., and a relative humidity of approximately 55%, and the moisture content and the enthalpy of this incoming air was 0.01 lbs water/lb dry air and 28.5 BTU/lb dry air, respectively]. Once the oven reached temperature of 290° F. and equilibrated, the trays were placed onto a rack in the oven. Since the product does not move through the $$\frac{m_a}{m_p} W_2 + w_1 = \frac{m_a}{m_p} W_1 + w_2$$

drying chamber, the mass balance equation can be converted to the following to convert the rate of product to a per product dry solids basis:

The rack oven operates under convective hot air conditions with a volumetric air flow of 120 CFM (cubic feet per minute), so with a specific volume of the incoming air is 13.75 cu. ft./lb dry air, the air flow rate is 527 lbs dry air/h. The final moisture content of the flour after 5 minutes at 290° F. in the rack oven was 2%. The quantity of air used in this rack oven to the quantity of product in the oven is calculated as 527 lbs dry air divided by 0.58 lbs dry solids, which equals 907 lbs of dry air per lb of dry solids. Solving the mass balance equation for the moisture content of the exiting air, $W_2$, there is no change in the moisture content in the exiting air due to such a large mass of convective hot air to the thin film of product. Also, as shown in FIG. 6 of the drying rate in this rack oven within one minute, where the flour reduced moisture from 13.6% (dry basis) to 2.3% within one minute, drying rate was 0.111 lbs water/(lb dry solids·minute) (0.111 kg water/(kg dry solids minute). Thus, this high rate and extent of moisture loss allows for a heat treatment to occur simultaneously where the treatment temperatures are significantly below the gelatinization temperature of flour below 3% moisture content (Burt and Russell, 1983; Eliasson, 1980).

The heat treatments in both Examples 11 and 12 resulted in flour with desirable farinograph properties (increased absorption and stability, and reduce MTI) and baking quality.

TABLE 9

Farinograph Flour Property Comparison
with Untreated 12.4% Protein Wheat Flour.

| Measured parameters | No heat treatment | 290° F., 5 min. | Difference |
|---|---|---|---|
| Absorption (500 BU) | 63.1 | 78.3 | 15.2 |
| Absorption (14% moisture) | 59.9 | 65.7 | 5.8 |
| Stability (min) | 16.6 | 20.2 | 3.6 |
| Development time (min) | 9.0 | 14.3 | 5.3 |
| Tolerance index (BU) | 18.0 | 15.0 | −3.0 |
| Time to breakdown (min) | 17.1 | 26.0 | 8.9 |
| Farinograph quality no. | 171.0 | 260.0 | 89.0 |

EXAMPLE 13

This example demonstrates examples of baked products make from heat-treated flour which had poor baking performance.

Dough manufactured using heat treated flour should contain optimum level of water to exhibit improved bake performance. Three batches of French bread dough were manufactured using untreated flour, flour treated at 320° F. for 4 min (with 5% water, on flour basis, in excess of that used for control), and flour treated at 320° F. for 8 min (with 10% water, on flour basis, in excess of that used for control). The specific volume of the baked product was 5.55, 4.59, and 3.06 mL/g, respectively.

EXAMPLE 14

This example demonstrates heat-treatment of flours made from various cereal grains. In this example, higher protein content wheat flour required higher temperature within treatment time to achieve +5% increased absorption (14% moisture basis):

TABLE 10

| | Whole Wheat Flour | | | Wheat Flour | | |
|---|---|---|---|---|---|---|
| Measured parameters | No heat treatment | 320° F. 4 min. | Difference | No heat treatment | 320° F. 4 min. | Difference |
| Absorption (500BU) | 72.7 | 85.3 | 12.6 | 63.1 | 80.3 | 17.2 |
| Absorption (14% moisture) | 67.0 | 72.3 | 5.3 | 59.9 | 67.4 | 7.5 |
| Stability (min) | 13.9 | 12.5 | −1.4 | 16.6 | 29.2 | 12.6 |

TABLE 10-continued

|  | Whole Wheat Flour | | | Wheat Flour | | |
|---|---|---|---|---|---|---|
| Measured parameters | No heat treatment | 320° F. 4 min. | Difference | No heat treatment | 320° F. 4 min. | Difference |
| Development time (min) | 9.3 | 10.8 | 1.5 | 9.0 | 19.3 | 10.3 |
| Tolerance index (BU) | 18.0 | 17.0 | −1.0 | 18.0 | 10.0 | −8.0 |
| Time to breakdown (min) | 16.1 | 18.9 | 2.8 | 17.1 | 35 | 17.9 |
| Farinograph quality no. | 161.0 | 189.0 | 28.0 | 171.0 | 350.0 | 179.0 |

TABLE 11

Farinograph of treated and untreated cake flour.

| Measured parameters | Untreated flour | 290° F. 5 min. | Difference |
|---|---|---|---|
| Absorption (500 BU) | 53.2 | 65.5 | 12.3 |
| Absorption (14% moisture) | 50.4 | 55.2 | 4.8 |
| Stability (min) | 4.5 | 5.7 | 1.2 |
| Development time (min) | 3.2 | 4.9 | 1.7 |
| Tolerance index (BU) | 0.0 | 101.0 | 101 |
| Time to breakdown (min) | 4.6 | 6.0 | 1.4 |
| Farinograph quality no. | 46.0 | 60.0 | 14.0 |

TABLE 12

Farinograph of treated and untreated pastry flour.

| Measured parameters | Untreated flour | 290° F. 5 min. | Difference |
|---|---|---|---|
| Absorption (500 BU) | 55.2 | 67.7 | 12.5 |
| Absorption (14% moisture) | 52.4 | 57.2 | 4.8 |
| Stability (min) | 7.7 | 9.6 | 1.9 |
| Development time (min) | 3.5 | 5.4 | 1.9 |
| Tolerance index (BU) | 65.0 | 65.0 | 0.0 |
| Time to breakdown (min) | 5.7 | 7.4 | 1.7 |
| Farinograph quality no. | 57.0 | 74.0 | 17.0 |

TABLE 13

Farinograph of treated and untreated muffin flour.

| Measured parameters | Untreated flour | 290° F. 5 min. | Difference |
|---|---|---|---|
| Absorption (500 BU) | 61.6 | 73.2 | 11.6 |
| Absorption (14% moisture) | 56.0 | 60.4 | 4.4 |
| Stability (min) | 8.5 | 13.8 | 5.3 |
| Development time (min) | 1.4 | 11.8 | 10.4 |
| Tolerance index (BU) | 14.0 | 15.0 | 1.0 |
| Time to breakdown (min) | 1.4 | 21.0 | 19.6 |
| Farinograph quality no. | 14.0 | 210.0 | 196.0 |

EXAMPLE 15

This example describes the water activity and rehydration of heat-treated flour.

Heat treatment of flour reduces the moisture content of the flour between 0.015-0.041 kg water/kg dry solids, and the water activity measured at this moisture content range was <0.05. One major deteriorative reaction of flour at this low water activity during storage is lipid oxidation, and rates of lipid oxidation increase as water activity increases and decreases from 0.35. Hence, the lowest rate of lipid oxidation occurs around $A_W$ of 0.35. Untreated flour at 12.3% (wet basis) has water activity around 0.56. From a typical graph of rate of lipid oxidation as a function of equilibrium moisture content and water activity, the rate of lipid oxidation around a water activity of 0.55 is equal to the rate around 0.15; therefore, extended shelf life of heat treated flour requires the flour to be rehydrated to a moisture content within the water activity range of $0.15<A_W<0.55$. A moisture sorption isotherm of untreated and heat treated flour was conducted to determine the relationship between equilibrium moisture content and water activity following the procedures outlined by Spiess and Wolf (1987). Water activity of a food is basically a measure of a food's water vapor pressure in an enclosed environment at a given temperature and can be determined by measuring its equilibrium relative humidity and then dividing by 100. A moisture sorption isotherm procedure consists of conditioning the food sample to a given equilibrium relative humidity using saturated salt solutions at a given temperature in a sealed dessicator and then measuring the food sample's moisture content after being conditioned. In this experiment, 8 different relative humidity conditions were used to determine the isotherm of untreated and heat treated flour, as shown in the table below:

TABLE 14

| Saturated Salt Solution | Equilibrium Relative Humidity at 20° C. |
|---|---|
| Lithium Chloride [LiCl] | 11.0% |
| Potassium Acetate [CH$_3$COOK] | 23.0% |
| Magnesium Chloride [MgCl$_2$] | 33.0% |
| Potassium Carbonate [K$_2$CO$_3$] | 43.2% |
| Sodium Bromide [NaBr] | 56.5% |
| Sodium Chloride [NaCl] | 75.4% |
| Potassium Chloride [KCl] | 85.0% |
| Barium Chloride [BaCl] | 90.0% |

Figure 10:
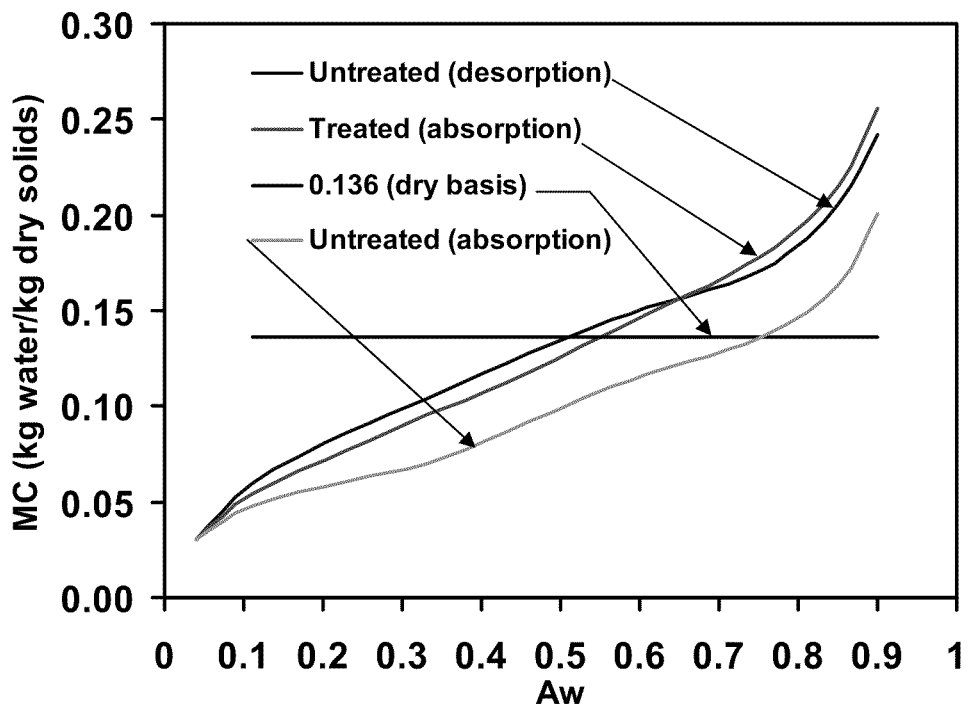
FIG. 10. Graphical representation of moisture sorption isotherm data. Moisture sorption isotherm of 12.5% protein flour.

The dessicators served as the hygrostat providing a contained environment for the saturated salt solution and three different samples: untreated flour, heat treated flour, and microcrystalline cellulose as a reference material. Each sample was present in triplicate thus making a total of nine samples in each hygrostat. A porcelain plate was used in each dessicator to support the samples above the saturated salt solution. The samples were contained in glass weighing bottles with ground-in stoppers to protect the sample from absorbing or losing moisture during weighing. While the samples were contained in the dessicators, the stoppers were placed on its side on top of its corresponding glass bottle to expose the sample to the environmental conditions within the dessicator. Microbial growth takes place at water activities of 0.6 and above; therefore, approximately 2 grams of thymol in a pan were placed in those dessicators with equilibrium relative humidities above 60%. Equilibrium required approximately 6 weeks. For dry solids determination, the weighing bottles with corresponding lids placed on its side on top of each bottle were placed into a vacuum oven for 5 hours at 98° C. and 2.5 cm (1-in.) Hg vacuum. Afterwards, the bottles were placed into a large dessicator with at least 1 cm polyphosphoric acid on the bottom below the porcelain plate overnight to allow any remaining moisture in the samples to be removed. The sample weights were then measured, which the net weights were dry solid weights and moisture content on a dry basis were calculated for each sample at each equilibrium relative humidity condition. The results of the moisture sorption isotherm are shown in FIG. 10.

At a given water activity below 0.6, the heat treated flour has a lower equilibrium moisture content than the untreated flour desorption isotherm. The very interesting observation shown in the moisture sorption isotherm is that the heat treated flour showed an absorption isotherm greater than the absorption isotherm of untreated flour, which means that at any given moisture content the water activity of the treated flour was lower than the re-absorbed untreated flour. Moreover, the treated flour in relation to the desorption isotherm showed less hysteresis than untreated flour. The results of this isotherm indicate that the required moisture content of the heat treated flour to reach a range where rates of lipid oxidation are at a minimum is between 0.08-0.136 kg water/kg dry solids.

TABLE 15

| $A_w$ | Treated |
|---|---|
| 0.04 | 0.030 |
| 0.11 | 0.054 |
| 0.23 | 0.077 |
| 0.33 | 0.095 |
| 0.43 | 0.112 |
| 0.565 | 0.139 |
| 0.754 | 0.179 |
| 0.85 | 0.216 |
| 0.9 | 0.255 |

Rehydration kinetics of heat treated flour was conducted in a proofer at 85° F. and 85% relative humidity under natural convection. Small quantities of heat treated flour (1-1.5 g) were sifted onto aluminum pans and placed into the proofer, and duplicate samples were weighed after every 5 min. The result of rehydration is shown in FIG. 11.

Figure 11:
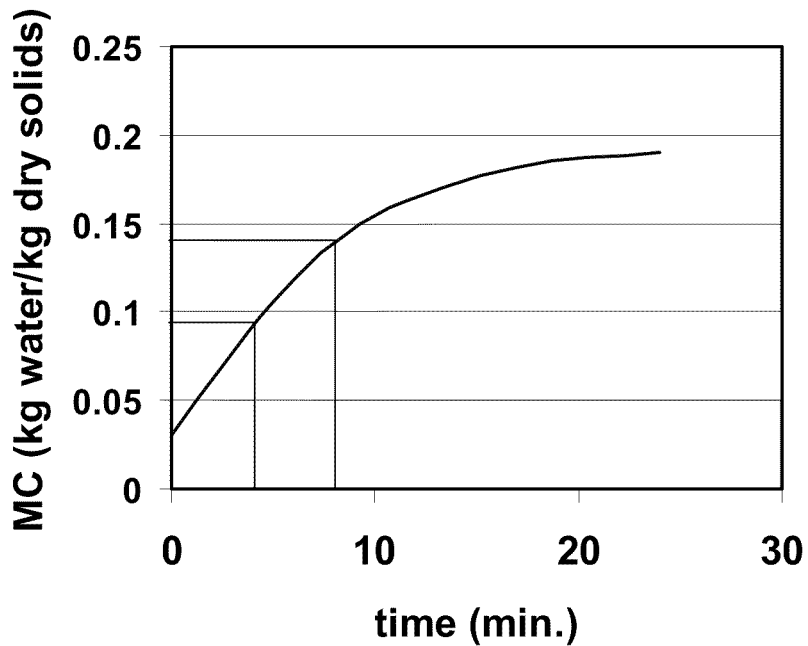
FIG. 11. Graphical representation of rehydration data. Heat-treated 12.5% protein flour rehydrated in a natural convection environment of 29.4° C. (85° F.) and 85% RH.

As shown in FIG. 11, the time to rehydrate the heat treated flour to an intermediate moisture is between 4 and 9 min. The humidity of rehydration should be at least 35% RH, since the equilibrium relative humidity needs to be at or above 0.35, and can be as high as 100% RH to increase the driving force for rehydration. Care should be taken if rehydration humidity environments of over 60% are used since there is potential for the flour to eventually rehydrate to levels above 0.6 water activity, where lipid oxidation rates significantly increase and microbial growth is possible. The temperature range for rehydration should be between 20° C.-100° C., and extreme temperatures should be avoided which could further alter the heat treated flour.

EXAMPLE 16

This example describes the effect of flour heat-treatment conditions on dough and baked product properties.

Figure 12:
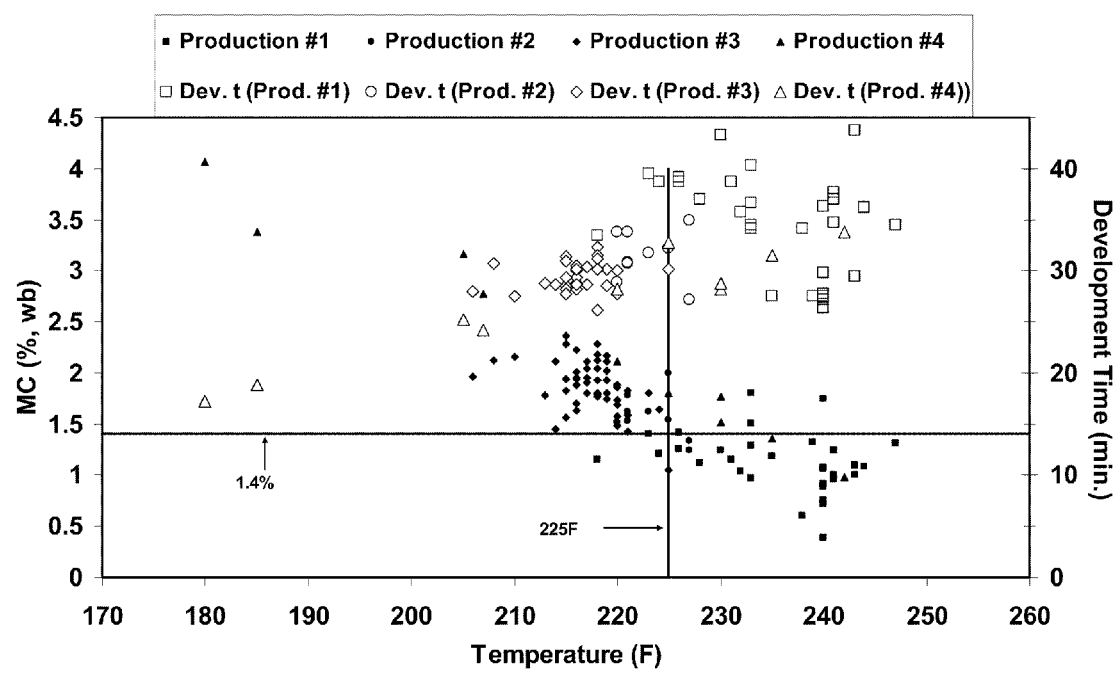
FIG. 12. Graphical representation of effect of flour heat treatment conditions on dough development time.
Figure 13:
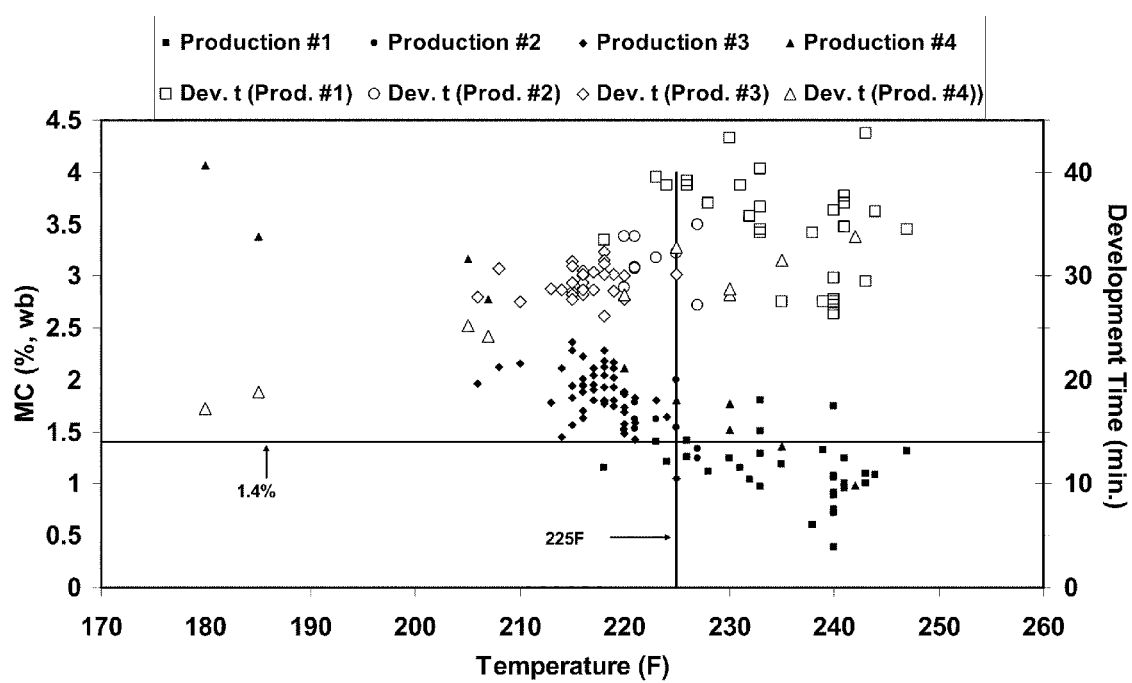
FIG. 13. Graphical representation of effect of flour heat treatment conditions on moisture absorption.

Flour was dehydrated in a flash dryer (flour exit temperature is x-axis in FIGS. 12-13). The flour was then heat treated in a Solidaire® heat exchanger under the following conditions (see FIGS. 12-13): Productions #1-3 jacket temperature of 270° F. with a product exit temperature of 250° F., and Production #4 jacket temperature was 290° F. with a product exit temperature of 270° F.

Figure 14:
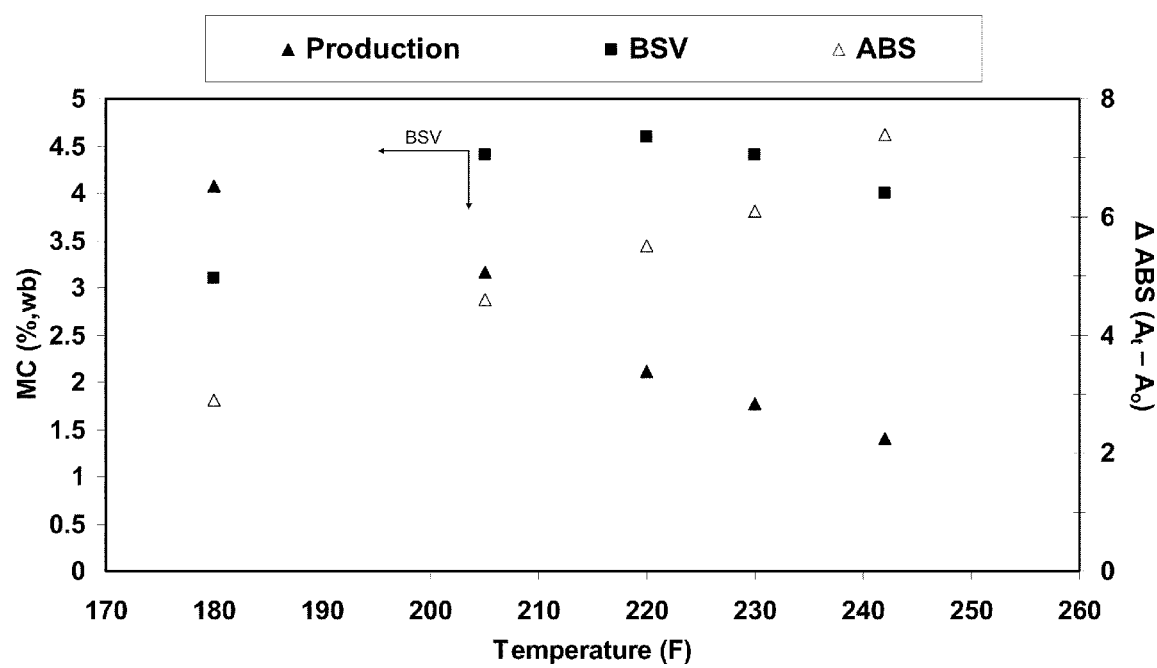
FIG. 14. Graphical representation of effect of flour heat treatment conditions on baked specific volume.

FIG. 14 shows BSV at the various flash dryer exit conditions. The Solidaire® jacket temperature was 290° F. and the product temperature was 270° F.

The invention has been described through specific examples. Routine modifications are apparent to having skill in the art and are intended to be within the scope of the invention disclosed herein.

The invention claimed is:

1. A method for creating heat-treating flour comprising the steps of:
   a) providing a flour;
   b) thermally dehydrating said flour such that a moisture content of said flour is reduced to 1.5 to 4.1%, said flour is not gelatinized during said step of thermally dehydrating said flour, to obtain a dehydrated flour; and,
   c) heating said dehydrated flour at a temperature of 330F or less while maintaining the moisture content of said dehydrated flour at 1.5% or above to obtain said heat-treated flour;
   wherein at least 7% of a total amount proteins in said heat-treated flour are denatured and said heat-treated flour includes discernible starch particles,
   said heat-treated flour exhibiting an increase in moisture absorption of at least 3% relative to untreated flour,
   said heat-treated flour is not gelatinized during said step of heating said dehydrated flour,
   said heat-treated flour having a water activity (Aw) of up to 0.45,
   steps b) and c) are carried out as two discrete unit operations,
   a particle size distribution of said heat-treated flour is such that greater than 80% of particles are between 90 and 150 microns,
   said step of heating said dehydrated flour carried out in a separate heating apparatus and at a different temperature, a different period of time, or combinations thereof from a heating apparatus used in said step of thermally dehydrating said flour.

2. The method as defined in claim 1, wherein a temperature of step b) being less than said temperature of step c).

3. The method as defined in claim 1, wherein said thermally dehydrating in step b) is carried out in less than one minute.

4. The method as defined in claim 2, wherein said thermally dehydrating in step b) is carried out in less than one minute.

5. The method as defined in claim 1, wherein said heating in step c) is carried out within 2-20 minutes.

6. The method as defined in claim 4, wherein said heating in step c) is carried out within 2-20 minutes.

7. The method as defined in claim 1, wherein said heating in step c) is carried out at a temperature of 260-330° F.

8. The method as defined in claim 6, wherein said heating in step c) is carried out at a temperature of 260-330° F.

9. The method as defined in claim 1, wherein said thermally dehydrating dehydrating in step b) is carried out in a co-current air flow dryer such that an exit temperature of said dehydrated flour is 180-245° F. and a residence time of said flour in said co-current air flow dryer is 5-20 seconds.

10. The method as defined in claim 8, wherein said thermally dehydrating in step b) is carried out in a co-current air flow dryer such that an exit temperature of said dehydrated flour is 180-245° F. and a residence time of said flour in said co-current air flow dryer is 5-20 seconds.

11. The method as defined in claim 9, wherein said exit temperature of said dehydrated flour is 205-225° F. and a residence time of said flour in said co-current air flow dryer is 8-12 seconds.

12. The method as defined in claim 1, wherein said heating in step c) is carried out in an indirect heating apparatus such that said dehydrated flour is subjected to a temperature of 260-330° F. for 2 to 20 minutes.

13. The method as defined in claim 10, wherein said heating in step c) is carried out in an indirect heating apparatus.

14. The method as defined in claim 12, wherein said heating in step c) is at a temperature of 290-325F for 2 to 6 minutes.

15. The method as defined in claim 1, wherein during said thermal dehydration in step b) said moisture content of said flour is reduced to 2-3.5%.

16. The method as defined in claim 13, wherein during said thermal dehydration in step b) said moisture content of said flour is reduced to 2-3.5%.

17. The method as defined in claim 1, wherein up to 13% of said total amount proteins in said heat-treated flour are denatured.

18. The method as defined in claim 16, wherein up to 13% of said total amount proteins in said heat-treated flour are denatured.

19. The method as defined in claim 1, wherein said water activity (Aw) of said heat-treated flour is 0.03 to 0.55.

20. The method as defined in claim 18, wherein said water activity (Aw) of said heat-treated flour is 0.03 to 0.55.

21. The method as defined in claim 1, further comprising the steps of rehydrating said heat-treated flour such that a moisture content is 6-10% and said water activity is from 0.15-0.55.

22. The method as defined in claim 20, further comprising the steps of rehydrating said heat-treated flour such that a moisture content is 6-10% and said water activity is from 0.15-0.55.

23. The method as defined in claim 1, wherein said particle size distribution of said heat-treated flour is such that greater than 7% of said flour particles are between 150 and 250 microns.

24. The method as defined in claim 22, wherein said particle size distribution of said heat-treated flour is such that greater than 7% of said flour particles are between 150 and 250 microns.

* * * * *